(12) United States Patent
Laivins et al.

(10) Patent No.: US 6,651,769 B2
(45) Date of Patent: Nov. 25, 2003

(54) FENDER ASSEMBLY AND SYSTEM FOR RACING MOTORCYCLE VEHICLES

(75) Inventors: Glen Arthur Laivins, Hebron, OH (US); Kenneth Thomas Laivins, Hebron, OH (US)

(73) Assignee: Next World Design, Inc., Columbus, OH (US)

( * ) Notice: Subject to any disclaimer, the term of this patent is extended or adjusted under 35 U.S.C. 154(b) by 8 days.

(21) Appl. No.: 10/039,409

(22) Filed: Jan. 3, 2002

(65) Prior Publication Data

US 2003/0121708 A1 Jul. 3, 2003

(51) Int. Cl.[7] ............................................. B62M 7/00
(52) U.S. Cl. ...................................... 180/229; 180/68.1
(58) Field of Search .............................. 180/229, 219, 180/68.1; 280/847, 853, 159, 160; 293/42

(56) References Cited

U.S. PATENT DOCUMENTS

| 4,066,291 A | * | 1/1978 | Hickman .................... 296/78.1 |
| 4,519,473 A | | 5/1985 | Ochiai et al. |
| 4,557,345 A | | 12/1985 | Hamane et al. |
| 4,564,081 A | | 1/1986 | Hamane et al. |
| 4,781,258 A | * | 11/1988 | Tamura ...................... 180/68.1 |
| 4,799,568 A | | 1/1989 | Tanaka |
| 4,818,012 A | * | 4/1989 | Kohama et al. ............ 296/78.1 |
| 4,822,067 A | | 4/1989 | Matsuo et al. |
| 4,830,135 A | | 5/1989 | Yamashita |
| 4,887,688 A | | 12/1989 | Horike et al. |
| 4,911,494 A | * | 3/1990 | Imai et al. ................. 296/78.1 |
| 4,913,256 A | * | 4/1990 | Sakuma ...................... 180/229 |
| 4,964,484 A | * | 10/1990 | Buell .......................... 180/219 |
| 4,982,973 A | | 1/1991 | Saito et al. |
| 5,490,573 A | * | 2/1996 | Hagiwara et al. ........... 180/68.1 |
| 6,422,332 B1 | * | 7/2002 | Takata et al. ............... 180/68.3 |

| 2003/0000755 A1 | * | 1/2003 | Schroeder ................... 180/229 |

FOREIGN PATENT DOCUMENTS

| JP | 05338571 A | * | 12/1993 | ............. B62J/15/00 |
| JP | 06298146 A | * | 10/1994 | ............. B62J/39/00 |
| JP | 08253186 A | * | 10/1996 | ............. B62J/39/00 |

* cited by examiner

*Primary Examiner*—Lesley D. Morris
*Assistant Examiner*—Daniel Yeagley
(74) *Attorney, Agent, or Firm*—Mueller and Smith, LPA

(57) ABSTRACT

A fender assembly and associated air transfer and dirt protection system for an off-the-road sports racing motorcycle. The fender assembly incorporates an upper portion and a lower portion which are mated to define an air transfer duct which extends from a forward region of the upper portion upper surface to an air exit opening at that same upper surface which is located adjacent the air receiving surface of an engine radiator. The fender assembly is configured for co-pivotal movement with the steering fork assembly of the motorcycle such that the duct will supply coolant air into the radiator notwithstanding the pivotal or steering movement of the forward wheel of the vehicle. A venturi restrictive region is formed within the air transfer duct to enhance the velocity of air exiting into the radiator. To control the buildup of mud at the underside of the fender, the upper portion of the fender is configured of a polymeric material, which incorporates an upwardly disposed pigmented layer. However, the lower portion of the fender assembly is formed of polymeric material, the underside being a layer of unpigmented porcelain which avoids the adherence of mud particles and dirt to such underside and thus, avoids the weight-contributing mud buildup. With the system of the invention, a fairing assembly is configured with a forward air scoop opening which cooperates with the air exit opening of the fender-borne air transfer duct to direct otherwise lost velocity enhanced coolant air across the cylinder head region of the motorcycle engine.

31 Claims, 4 Drawing Sheets

FENDER ASSEMBLY AND SYSTEM FOR RACING MOTORCYCLE VEHICLES

CROSS-REFERENCE TO RELATED APPLICATIONS

STATEMENT REGARDING FEDERALLY SPONSORED RESEARCH

Not applicable.

BACKGROUND OF THE INVENTION

Motorcycle racing has been a popular sport essentially since the evolution of a practical internal combustion engine. Over recent years, this racing sport has migrated to carefully configured dirt courses or tracks wherein typically, about twenty sport motorcycles, which are particularly configured for this sport are raced. The vehicles may be conventionally two-wheeled or three-wheeled. In the former regard, the sport has been coordinated under an organizational movement identified as "Motocross". Because of these contrived dirt courses, straight stretches will be encountered which are driven at high speeds; curves will be encountered; and jumps will be called for. In the latter regard, a jump is developed from a mound of dirt which, when encountered by the driver and motorcycle, may propel the participant about 15 feet in the air across 85 feet of terrain at speeds typically about 50 miles per hour. As is apparent, the vehicles which are employed for this sport must be quite robust and the power generated by their engines must be maximized to achieve success in this popular racing arena.

Motorcycles used in motocross racing specifically are designed to withstand the rigors of the dirt track while retaining the look of early stock motorcycles. Such a vehicle typically has a bifurcate forward fork assembly with oppositely disposed wheel mounts, each including a resilient compressible tube, these two tubes extend downwardly to attach to opposite sides of a front wheel. The fork assembly extends upwardly to a handlebar. Each of the compressible tubes includes a spring and a shock absorber, creating a front suspension which allows the motorcycles to withstand the substantial forces occasioned, for instance, from jump landings.

Early sporting motorcycles utilized air-cooled motors, however, fluid coolant circulating radiators now are mounted on the frames of the motorcycles. These radiators are located directly behind the forward fork assembly and in front of the cylinder head of the motor. Air cooling is required for radiators. However, the stream of air occasioned by the forward movement of the motorcycles, which otherwise may be directed into the radiators, may be blocked by the front fender. This is particularly true where the front wheel is pivoted to an extent where the rear region of the forward fender will block an adjacent significant proportion of the radiator air confronting surface. With such blockage, the temperature of operation of the motor will tend to increase. Studies in the field have shown that for about each 10° F. elevation in temperature of motor operation, as is evidenced at the radiator surface, a loss of about 1 horsepower will be witnessed. In the field of motorcycle racing, a loss of 1 horsepower may have a significant impact on the performance of the motorcycle and its driver. Oil coolers also have been installed in the motor assemblies in view of the importance of temperature control. Generally, these secondary coolers are located behind the main coolant radiators. Of course, the passage of air along the cylinder head region of the motor remains to be important as evidenced by the presence of heat sinking fins which are typically formed with the cylinder heads of the engine.

Another factor that affects the performance of sport racing motorcycles is mud. When the dirt tracks become wet, the resulting mud is flung up from the wheels creating a hazard to the riders. Additionally, this mud adheres to the vehicles adding weight. Of course, weight contributes to a lessening of the dynamic performance of the motorcycle vehicle. Thus, where components of the sports vehicles build up mud layers, performance is diminished to lessen the chances for success in the competitive sporting arena.

Fenders heretofore provided for these two-wheeled vehicles generally are not designed to deal with the particular problems associated with dirt course racing.

BRIEF SUMMARY OF THE INVENTION

The present invention is addressed to fender assemblies and an air transfer and a dirt protection system for motorcycles, particularly sport vehicles intended for racing over dirt courses. Such vehicles achieve racing performance, inter alia, by maximizing the performance of their internal combustion drive motors and by control over the weight build-up due to the adherence of mud particles to their surfaces.

The fender assembly is configured for mounting upon the forward fork assembly of such vehicles in a manner wherein it pivots with and remains in continuous alignment with the plane of rotation of the front wheel. A radiator circulating fluid coolant for the vehicle motor will be located in spaced adjacency with the rear region of the fender assembly. Avoidance of fender caused air blockage to the motor, particularly when the front wheel is turned or pivoted in a steering maneuver, is achieved by the provision of a cooling air transfer duct extending from a forward top surface region air intake scoop on the fender assembly to an air exit opening at a rear region thereof adjacent the air receiving region of the radiator. To enhance the velocity of airflow from the assembly exit opening and, thus enhance the performance of the engine cooling system, the cooling air transfer duct is configured to define a venturi device or tube.

Weight control due to mud buildup is accommodated by the structuring of the fender assembly, in effect, with an upper portion and a lower portion. Because the surface of the upper portion of the fender assembly will carry an ornamentation, it is provided as a molded polyolefin component with a high-shine porcelain layer carrying pigmentation developing an appearance or design desired by the designers. A lower polyolefin molded component combines with the upper portion to evoke the noted venturi device containing air transfer duct. It is the lower or front wheel-confronting surface of this lower portion, which is called upon to block dirt, debris and mud particles, particularly as will be launched by the forward wheel. Accordingly, the undersurface or surface confronting the forward wheel of the lower portion of the fender assembly is configured with a layer of porcelain. However, to conserve weight otherwise developed from pigment materials, this layer is unpigmented.

In a preferred embodiment, the upper and lower portions are provided as discrete components, which are connected together by removable connector assemblies. Thus the assembly can be broken down for cleaning following utilization. Alternately, the upper portion and lower portion may be designed for co-extrusion molding processes to develop a unitary component. It should be recognized, however, that all components can be manufactured also by thermoforming techniques, injection molding techniques, or the like.

With the system of the invention, the front fender assembly with its cooling air transfer duct feature, is configured to perform in conjunction with protective fairings or shrouds which extend downwardly over the vehicle motor at each side of the motorcycle frame. These protective fairings extend from the radiator region along the sides of the cylinder head components of the motor. By configuring them with forward air scoops extending outwardly from the transverse sides of the radiator assembly and by providing an airflow path to an exit opening rearwardly of the fairing-incorporated scoops, the velocity enhanced cooling airflow from the fender assembly can be directed along the cylinder head region of the motor during forward wheel turning maneuvers which would extend a portion of the fender assembly duct exit opening beyond the radiator sides. Thus, an airflow is developed which provides an enhanced thermal exchange with the cylinder head surface region of the motor during intense turning maneuvers.

The protective fairings also may be configured having airfoils located forward of the motor and extending inwardly toward the radiator sides. These airfoils create an additional venturi effect within the system to further increase the flow of air across the heat generating components of the motorcycle. The airfoils open rearwardly to provide airflow communication through the fairings intermediate the forward air scoops and the rearwardly located air exit openings. To facilitate the exhaust of heated air from the system, air exit collectors located rearwardly of the motor may be provided on the side fairings.

Other objects of the invention will, in part, be obvious and will, in part, appear hereinafter.

The invention, accordingly, comprises the apparatus and system possessing the construction, combination of elements and arrangement of parts, which are exemplified in the following detailed disclosure. For a fuller understanding of the nature and objects of the invention, reference should be had to the following detailed description taken in connection with the accompanying drawings.

DETAILED DESCRIPTION OF THE INVENTION

The front fender assembly and air transfer and dirt protection system of the invention find particular application in connection with motorcycle-type vehicles, which are utilized in connection with sporting events. During such sporting utilization of the vehicles, it is important to maintain the integrity of the motor drive components with respect to dirt and mud encountered in the terrain of a racing course and to further protect the very important power characteristics of the motor drive. These latter power characteristics become important in higher speed racing over level terrain; in negotiating jumps during which the motorcycle vehicle may launch to an elevation of about 15 feet in the air and traverse a jumping distance, for example, of about 85 feet, and in negotiating curves. The dirt tracks prepared for these maneuvers will be invested with mud as well as granular dryer dirt which readily may clog and impair engine cooling systems such as radiators and oil coolers to evoke a significant drop in engine power performance. Given that variations in driver performance will always exist in the racing world, that performance can be significantly impaired when the motive system of these vehicles is reduced in capability.

Figure 1:
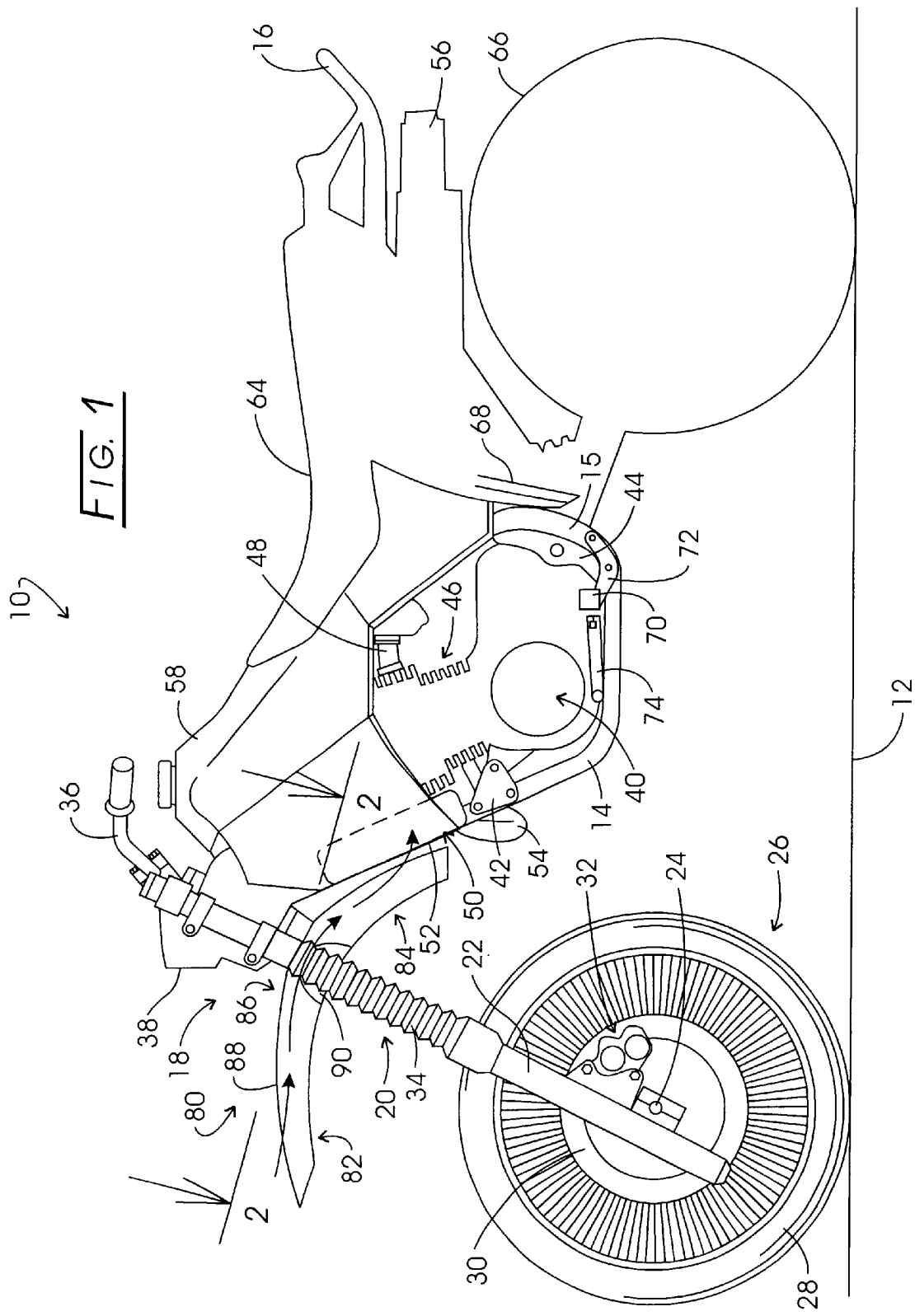
FIG. 1 is a side view of a sport racing motorcycle of a two-wheel variety employing the fender assembly of the invention and showing rearward components in silhouette fashion.

Looking to FIG. 1, a sport motorcycle of a two-wheel variety, represented in general at 10, is shown in conjunction with the terrain 12 of some form of course formed with variations of dirt. Motorcycle 10 is formed having a frame, one portion of which is revealed at 14 which extends integrally rearwardly as shown by frame portion 15 and ultimately, physically extends outwardly as represented in outline form at 16. The forward portion of the frame extends to and supports in pivotal fashion a forward fork assembly represented generally at 18. Assembly 18 comprises a two-component or bifurcate wheel mount represented generally at 20 which is formed of two, parallel, spaced apart fork tubes, one of which is shown in 22 extending to connection with the axle components or hub 24 of a forward wheel represented generally at 26. Forward wheel 26 incorporates a pneumatic tire 28 having spokes extending to the central axle defining hub 24 which also functions to support a brake disc 30. Disc 30 is engagable under operator control with a brake assembly represented generally at 32. The fork tubes as at 22 are relatively elongate, incorporating a shock absorber and spring based suspension which, in general, is protected by a compressible dirt cover as at 34. The bifurcate wheel mount extends upwardly to support steering handlebars 36. In keeping with the general requirements that racing motorcycle designs correspond somewhat with those of typical highway motorcycles, a headlamp, which is mounted forwardly is shown in silhouette at 38. An internal combustion motor is shown in general at 40, which is mounted upon the frame. In this regard, the forward motor mount is shown at 42, while a rear motor mount is shown at 44. The cylinder head region of motor 40 is revealed in general at 46 and at that region also is seen a carburetor with attendant air filter 48. Forwardly of the motor in the sense of direction of travel of the motorcycle 10 is a radiator assembly represented generally at 50 and having a forwardly facing air receiving region or the face 52 extending transversely with respect to the frame portion 14. The assembly 50 is coupled in cooling fluid transfer relationship with the motor 40 and will be seen to be fashioned of two radiator components, one at each side of the frame, which perform in common with the coolant fluid circulated therein. A portion of the exhaust system of motor 40 is shown at pipe 54. That exhaust system ultimately extends through a muffler to an exhaust outlet represented in silhouette at 56. Supported by the frame above the motor is a gas tank 58 and somewhat immediately behind the gas tank 58 is the motorcycle seat 64. As it extends rearwardly, the frame of the vehicle 10 supports a rear wheel shown in silhouette at 66 and a rear fender, a portion of which is shown in silhouette at 68. Gear shifting is implemented with a transversely outwardly extending footrest or peg 70, which is mounted upon frame portion 15 by a peg bracket 72. The peg 70 cooperates with a foot actuated gearshift lever assembly 74.

Shown mounted, for example, by bolted connection, upon the forward fork assembly 18 intermediate the lower disposed portion of the wheel mount and the handlebars 36 and below the forward frame portion 14 is a front fender assembly represented generally at 80. The assembly 80 has a longitudinal extent between a front region 82 extending forwardly from the forward fork assembly 18 and a rear region 84 extending rearwardly from the forward fork assembly 18 into spaced adjacency with the radiator assembly 50.

Figure 2:
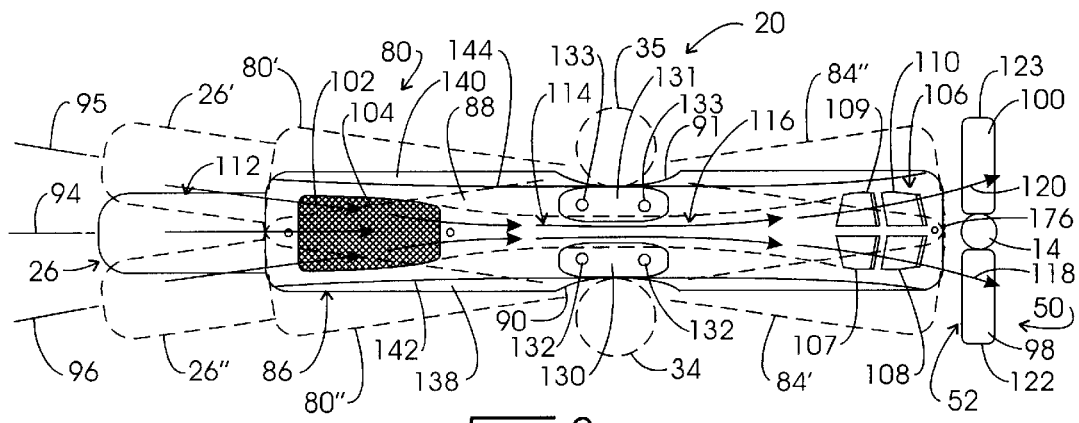
FIG. 2 is a sectional view taken through the plane 2—2 in FIG. 1 and showing pivotal orientations of the wheel and fender assembly in phantom.

FIGS. 1 and 2 reveal that the front fender assembly 80 comprises an upper portion represented generally at 86 with an upper surface 88 which, as seen in the profile revealed in FIG. 1 to be longitudinally curved along its longitudinal extent between forward region 82 and rear region 84. The fender assembly 80 is mounted above the forward wheel 26 and generally conforms to the curvature of the wheel. Note, however, that the fender assembly 80 is mounted to the forward fork assembly 18 at a relatively elevated orientation with respect to the periphery of forward wheel 26. This accommodates for the rather substantial amount of compression and dampening activity of the suspensions retained within the dirt covers 34 and 35. The mounting of the fender assembly 80 with the fork assembly 18 is at mutually oppositely disposed venturi restriction regions of generally curved convex configuration, as shown at 90 and 91 (FIG. 2). Thus, the front fender assembly 80 is mounted with the forward fork assembly 18, such that its longitudinal extent is continuously aligned and located above the forward wheel 26 plane of forward rotation.

FIG. 2 reveals three of these planes of rotation, a plane of rotation 94 representing a straight-ahead orientation of wheel 26; and an exemplary plane of rotation 95 representing a turning of wheel 26, which extends for about 10° to the right. In this regard, FIG. 2 shows wheel 26 in phantom at 26' for this orientation along with a corresponding orientation of front fender assembly 80 in phantom at 80'. For this latter orientation, note that the rear region of front fender assembly 80' as at 84' confronts the air receiving forward face or air receiving region 52 of left component 98 of radiator assembly 50. For this turning orientation, without more, a conventional forward fender would block the ingress of cooling air into the left component 98 of forward face 52.

Correspondingly, where the wheel 26 is turned about 10° to the left to assume a plane of rotation shown at 96, then the wheel 26 will have the orientation shown at 26" and the fender assembly 80 will assume the orientation shown at 80". Note that at this orientation, the rear region assumes the orientation shown in phantom at 84", an orientation wherein the fender rearward portion confronts the air receiving region 52 at right radiator assembly component 100. As before, without more, airflow to right component 100 would be blocked by the rear region 84".

FIG. 2 reveals that the upper portion 86 of the fender assembly 80 incorporates an elongate, somewhat trapezoidily shaped air intake scoop opening 102 over which is positioned an open mesh screen 104. The latter screen 104 serves to block entry of larger mud particles and the like through the opening 102. An air exit opening is formed within the front fender assembly 80 at its rear region 84 as shown in general at 106. Opening 106 includes two leftward openings 107 and 108 and two rightward openings, 109 and 110. Between the air intake scoop opening 102 and the air exit opening 106 there is defined a cooling air transfer duct through which air confronting the opening 102 will pass to be expelled from air exit opening 106 into the air receiving region 52 of radiator assembly 50. In this regard, for a straight ahead orientation of the wheel 26 as it rotates within the plane 94, airflow may be represented by air input arrows shown generally at 112 which extend through the opening 102. Such airflow, as represented at arrow groupings 114 and 116 is restricted adjacent the regions 90 and 91 by a configuration of the duct serving as a venturi tube device. Regions 90 and 91, in conventional fashion, function to increase the velocity of airflow, which then is ejected from air exit opening 106 to impinge upon air receiving region 52 at each radiator assembly component 98 and 100. In this regard, note respective arrows 118 and 120. Correspondingly, when the wheel 26, and thus the front fender assembly 80 is pivoted, for example, to the rotational axes 95 and 96, air will not be blocked at the confronting portion of the radiator assembly 50 but will extend through an adjacent radiator component 98 or 100. For some orientations, a certain amount of this accelerated airflow will pass around the outer sides 122 and 123 of the assembly 50. However, cooling air loss will not occur as a consequence of a certain amount of the venturi region accelerated airflow being directed outwardly from the sides 122 or 123. This is discussed in connection with FIG. 5. FIG. 2 also reveals that the front fender assembly 80 upper portion 86 includes slightly upwardly disposed or depending connector platforms 130 and 131 having respective bolt receiving aperture pairs shown respectively at 132 and 133. Platforms 130 and 131 are mutually transversely spaced apart in concert with the regions 90 and 91 a distance effective for mounting a front fender assembly 80 between the two components of the bifurcate wheel mount 20.

Figure 3:
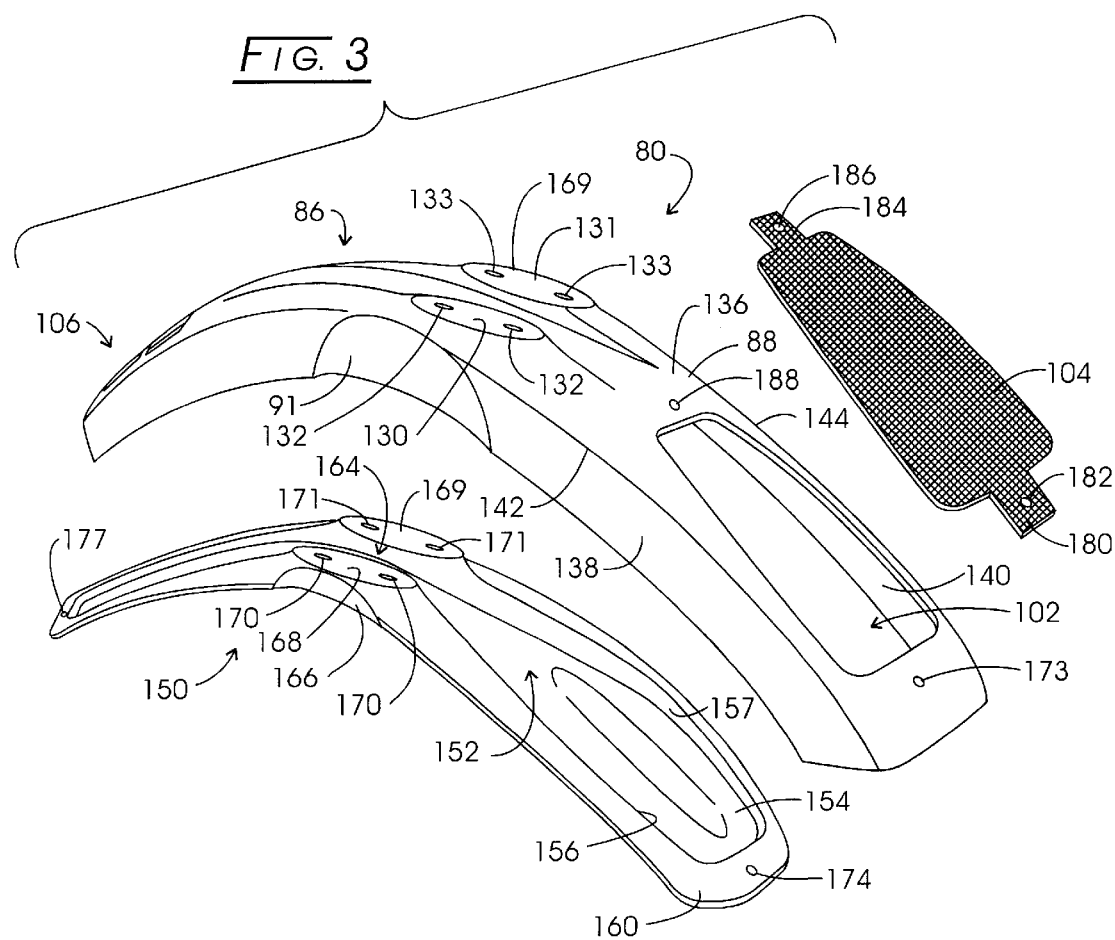
FIG. 3 is an exploded perspective view of the fender assembly shown in FIGS. 1 and 2.

The structuring of the front fender assembly 80 is revealed in FIG. 3. Looking to that figure, upper portion 86 is seen to be an integrally molded discrete component having a top 136 with the outward surface shown and an inwardly disposed surface (not shown) as well as integrally formed oppositely and downwardly disposed sides 138 and 140. While shown to be somewhat rectangular in transverse cross sectional configuration as indicated by ridges 142 and 144, a curvature may be provided in substitute therefore.

The lower portion of the front fender assembly 80 is represented generally at 150. For the instant embodiment, the lower portion 150 also is a discrete component having a lower disposed surface (not shown) which faces wheel 26 and is configured as a protective surface. Lower portion 150 extends between the earlier-described front region 82 and the rear region 84 (FIG. 1) and is seen to have an upper surface represented generally at 152 which includes an inwardly disposed duct-forming surface 154 and integrally formed and oppositely disposed duct-defining side surfaces 156 and 157. Surfaces 156 and 157 extend to a surrounding peripheral contact surface 160 which is configured for extending into abutting contact with the inwardly disposed top surface of the top 136 of upper portion 86. The duct defined by duct defining surfaces 154, 156 and 157, when the lower portion 150 is connected to the under surface of upper portion 86, establishes the noted air transfer duct. Note in the figure, that the duct defining side surfaces 156 and 157 converge mutually inwardly to define a venturi tube device at a venturi restriction region represented generally at 164 which is seen to be located intermediate the front region 82 and rear region 84 of the assembly 80 (FIG. 1). Venturi restriction region 164 is formed in concert with the formation of lower portion restriction regions at each side of lower portion 150, one of which is shown at 166. An identical lower portion restriction region is positioned mutually opposite restriction region 166 (not shown). The restriction region 166 as well as the side surfaces 156 and 157 are configured additionally to form two lower portion connector platforms shown respectively at 168 and 169. Platforms 168 and 169 are shaped to nestibly abut against the underside of upper portion 86 connector platforms 130 and 131. Platform 168 is seen to be configured having bolt receiving aperture pairs 170 while, correspondingly, platform 169 is seen to be configured having bolt receiving aperture pairs 171. Aperture pairs 170 and 171 are configured for mating alignment with the respective bolt receiving aperture pairs 132 and 133 of respective upper portion 86 platforms 130 and 131.

When upper portion 86 and lower portion 150 are abuttably united to form a singular fender assembly, the mated aperture pairs 170,132 and 171, 133 are in registry and are attached to the forward fork assembly 18 by bolt and nut connection. Further connections associated with the two components 86 and 150 are provided initially by bolted connection with apertures at the forward region, such apertures being seen respectively at 173 and 174. A corresponding rear region connection is provided by apertures 176 (FIG. 2) and 171 at the rear region of the upper and lower portions. Aperture 173 in upper portion 86 also functions to removably connect the open mesh screen 104 to the underside of the top 136 of upper portion 86. For this purpose, the screen 104 is configured having a tab 180 at its forward end which supports an aperture 182 which is co-connected at aperture 173 of portion 86 with lower portion 174. The opposite side of screen 104 incorporates a corresponding tab 184 with an aperture 186. Tab 184 is coupled to the upper portion 186 at the under side thereof by bolting connection through an aperture 188.

Overall vehicle weight is a highly important aspect of achieving maximum performance from a racing motorcycle as at 10. Discounting driver weight, among the factors contributing to weight are both the materials used in its fabrication and the build-up of mud and the like upon the surfaces of the vehicles during the course of racing. The fender assembly of the present invention looks to both of these characteristics by providing appropriate ornamented pigmentation, which is necessary to the sport while minimizing the overall weight of this fender assembly. Additionally, the lower component 150 of the fender assembly 80 is configured to incorporate a lower disposed surface material which is quite "slippery", tending to reject otherwise adhering mud clumps. Upper portion 86, which is intended to evoke a colorful image for the fender assembly 80, is formed of a polymeric material, and in particular, a polyolefin. Its color-based décor is provided by a layer of porcelain, which is pigmented in accordance with the desires of the designer and is provided with what is referred to as a "high shine" finish. That layer is only positioned upon the upwardly and outwardly disposed surface of the portion 86. Lower portion 150 also is molded of polymeric material and, in particular, a polyolefin. It also carries a lower protective surface formed of porcelain. That surface functions to exhibit a "slippery" characteristic functioning to retard the adherence of mud and dirt materials and the like to the underside of the assembly 80. As is apparent, that underside surface will encounter a substantial amount of mud and debris thrown up from the wheel 26 and developed generally from the environment of the racing course. A porcelain layer is utilized for this protective surface. However, that lower-disposed porcelain layer which confronts the wheel 26 is unpigmented to reduce the weight of the lower portion.

Figure 4:
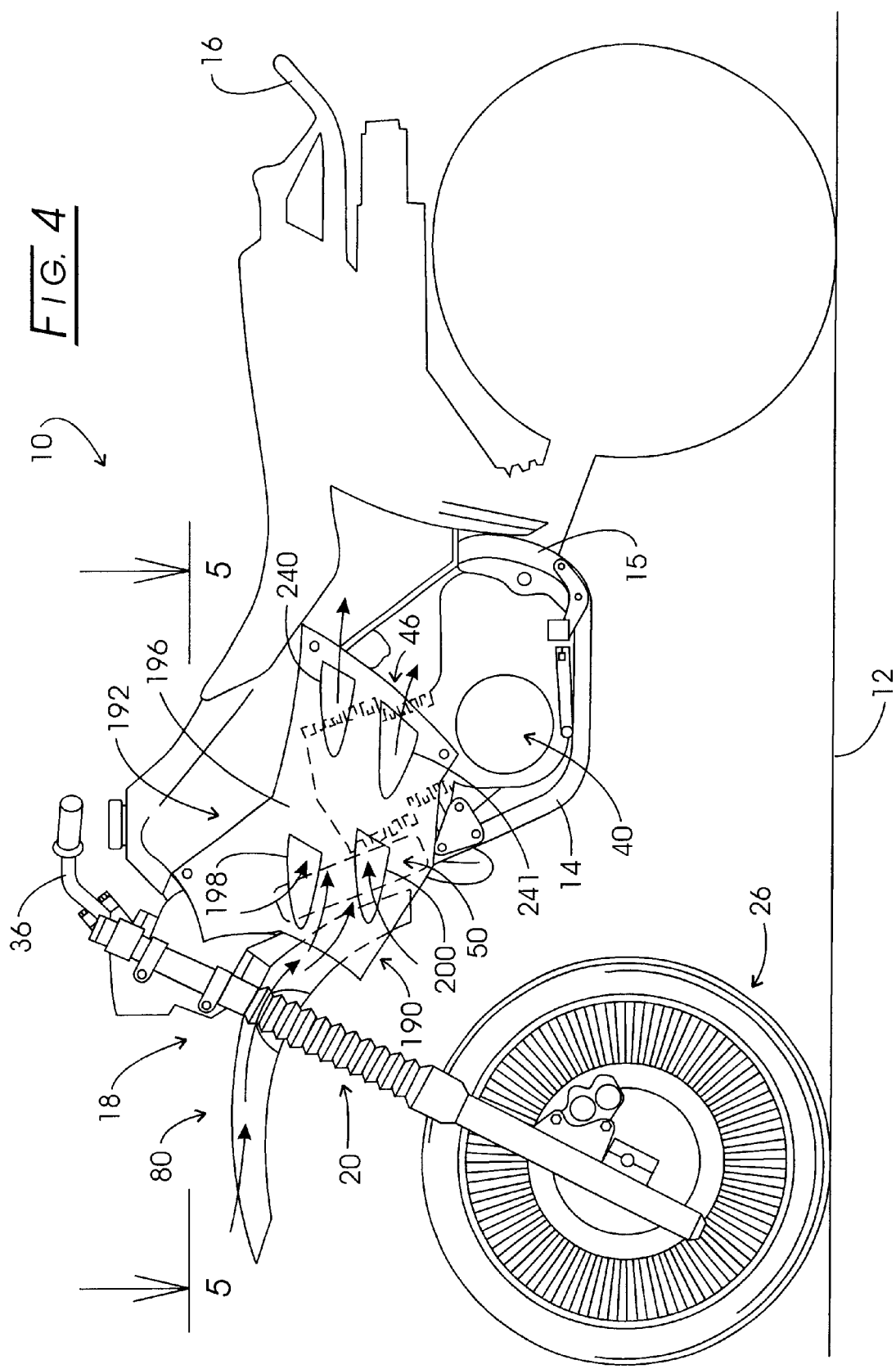
FIG. 4 is a side view of the sport racing motorcycle of FIG. 1 employing the air transfer and dirt protection system of the invention.

Front fender assembly 80, as described in detail in FIGS. 1–3, also may be used in conjunction with specially designed side fairings to form the air transfer and dirt protection system of the invention. For the sake of convenience, parts of the motorcycle and front fender assembly that have been previously described retain their earlier identifying numeration. Looking to FIG. 4, the system, shown generally at 190, includes front fender assembly 80 and a unique fairing assembly, 192.

Fairing assembly 192 consists of a pair of mutually, oppositely disposed side fairings 196 and 214 (FIG. 5), which, in conventional fashion, are removably connected to the frame of motorcycle 10, as at 220 and 222, at a position protecting motor 40. Side fairings 196 and 214 act to provide the side of motorcycle 10 with a smooth surface and to protect the internal motive components from dirt and mud, the build-up of which would adversely affect the performance of the motorcycle. The inner surface of these fairings extends spaced apart from and generally parallel to the outer sides of radiator components 98 and 100 and cylinder head region 46. Side fairings 196 and 214 each include a pair of airfoils, such as those shown at 198 and 200 on fairing 196. Preferably, these airfoils are integrally formed with the side fairings. As will be described in greater detail in connection with FIG. 5, the airfoils of fairing assembly 192 enhance the movement of air within the system. In general, that air movement is from scoop-defining forward air intakes 224 and 226 at air opening 210 and corresponding air exit openings shown generally at 240 and 242 at an air outlet 212. Fairings 196 and 214 also are seen to be provided with a pair of inwardly depending air exit collectors, 240 and 242, (see collectors 240 and 241 in FIG. 4) located rearwardly of motor 40, which facilitate the exhaust of heated air from the system by air velocity enhancement and venturi-based intake phenomena. While each fairing is shown having a pair of airfoil members and a pair of air exit collectors, the number of airfoils and air exit collectors of the fairing assembly may vary. Additionally, while the two fairings 196 and 214 are described as being symmetrical as to position, length, and weight, they may be asymmetrical in any of these characteristics.

Figure 5:
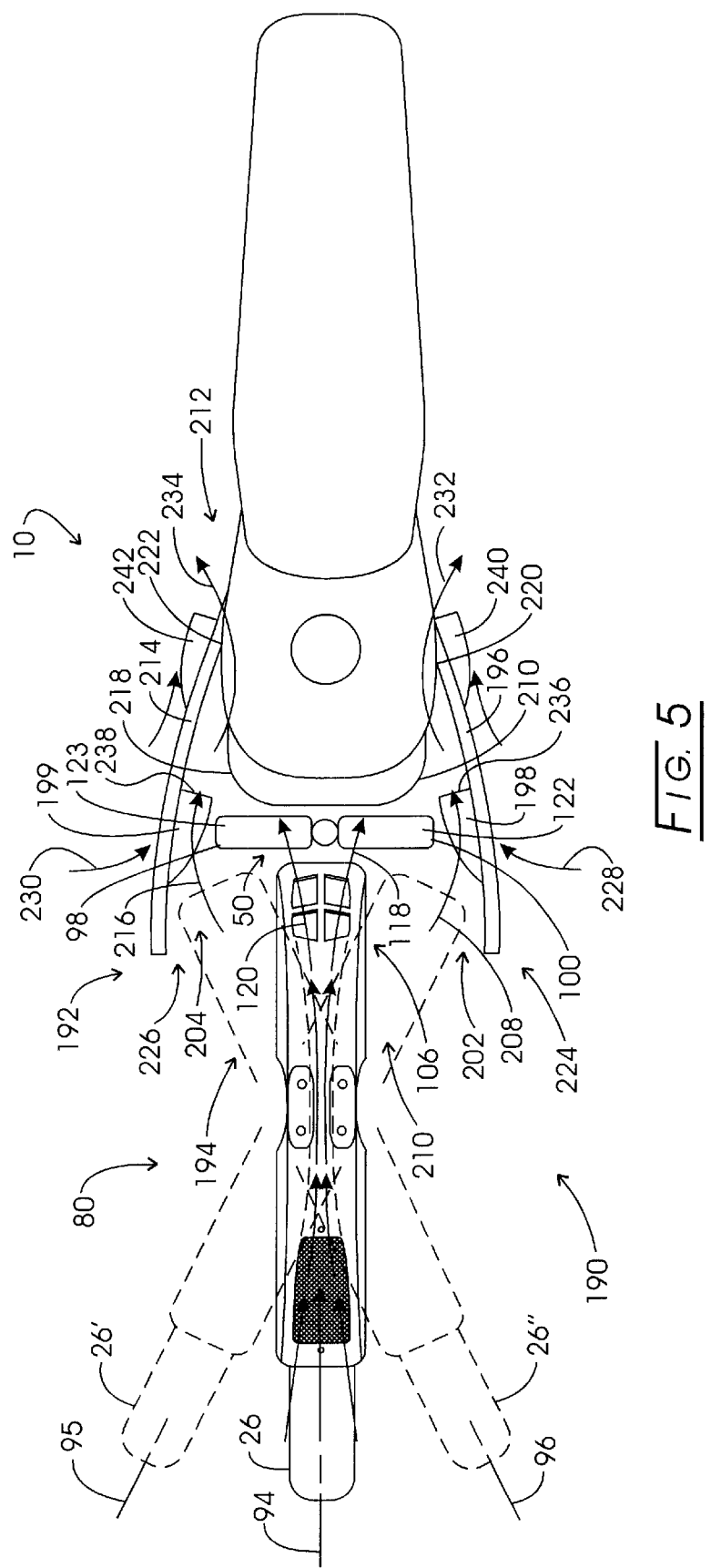
FIG. 5 is a sectional view taken through the plane 5—5 in FIG. 4 and showing pivotal orientations of the wheel and fender assembly of the system in phantom.

FIG. 5 reveals that, disposed within airflow path 194, are motor 40 and radiator assembly 50. These internal components divide an air pathway 194 into two air passages, 202 and 204. Side fairings 196 and 214 are seen to be slightly bowed outwardly from outer sides 122 and 123 of radiator assembly 50 to form forward air scoops at air inlet 210. These forward air scoops are shown generally at 224 and 226. When motorcycle 10 is propelled forward, a flow of air is directed within air pathway 194 between side fairings 196 and 214 from air inlet 210 to air outlet 212. Air flowing within the system is exhausted from air exit openings located at the rear of side fairings 196 and 214 at air outlet 212. Being tapered inwardly from air inlet 210 to air outlet 212, side fairings 196 and 214 create a venturi effect, which, in conventional fashion, increases the velocity of air flowing through pathway 194. This treated air promotes thermal transfer when it passes across the surfaces of the heat generating components of motorcycle 10.

FIG. 5 also reveals the airflow relationship between fairing assembly 192 and front fender assembly 80. As was described previously in connection with FIGS. 2 and 3, because of the unique configuration of front fender assembly 80, an accelerated airflow, represented by arrow groupings 118 and 120, will be ejected from air exit opening 106. This airflow will extend through an adjacent radiator component 98 or 100 when front wheel 26 is turned to a first more limited extent. When fender assembly 80 and associated front wheel 26 are turned more severely, side fairings 196 and 214 contribute with fender duct driven (accelerated) air to enhance engine cooling. In this regard, a portion of airflow expelled from the air exit openings, which would otherwise be lost, is intercepted by the forward air scoops of the side fairings and directed toward motor 40.

The three planes of front wheel rotation described in connection with FIG. 2 again are revealed in FIG. 5. Plane 94 again represents a straight-ahead orientation of wheel 26; plane 95 again represents the turning of wheel 26 at about 10° to the right; and plane 96 again represents the turning of wheel 26 at about 10° to the left. Forward air scoops 224 and 226 are seen to extend forward air exit opening 106 of front fender assembly 80. Thus, when front wheel 26 is turned, as represented in plane 95, a portion of air expelled from air exit opening 106 is intercepted by forward air scoop 224 and directed rearwardly as indicated by arrow 208 along air passageway 202. In similar fashion, when front wheel 26 is turned as represented by plane 96, a portion of air expelled from air exit opening 106 is trapped by forward air scoop 226 and directed along air passageway 204, as indicated by arrow 216. Without the side fairings of assembly 192, this intercepted air would otherwise "miss" radiator edges 122 and 123 during this front wheel turning movement.

Airflow within passageways 202 and 204 is accelerated further by the airfoils, 198–201, of fairing assembly 192. These airfoils are forwardly located on fairings 196 and 214 adjacent radiator assembly 50 and extend inwardly toward radiator sides 122 and 123. The upper airfoils of side fairings 196 and 214 are shown in FIG. 5 at 198 and 199, respectively. Airfoils 198–201 each create an additional venturi effect, which in conventional fashion, increases the velocity of air flowing within passageways 202 and 204. Hence, by providing a restriction within passages 202 and 204, airfoils 198–201 increase the heat transfer capabilities of system 190, and, extending inwardly as they do, these airfoils are able to enhance airflow within the system without interfering with the rider during operation of motorcycle 10.

Airfoils 198–201 also admit an additional flow of air into the interior of motorcycle 10. When motorcycle 10 is propelled forward, high velocity air flows along the outer surfaces of the side fairings. With a conventional side fairing or shroud, no significant air is directed inwardly through the fairings toward the internal components. With fairing assembly 192, however, accelerated air flowing within passages 202 and 204 across the tapered surfaces of fairings 196 and 214 creates an area of negative pressure along airfoils 198–201. When an opening is provided through each of the fairings 196 and 214, the pressure difference between the inside and outside surfaces of the fairings will force air inwardly toward the interior components of the motorcycle. For example, airfoil member 198 opens rearwardly at 236 to provide airflow communication through fairing 196, as indicated by arrow 228. Similarly, the upper airfoil member 199 on the opposite side of the motorcycle opens rearwardly at 238 to provide airflow communication through fairing 214, as indicated by arrow 230. Thus, airfoil members 198–201 contribute to the system by increasing the velocity of air flowing within airflow path 194, as well as introducing an additional source of air into the center of motorcycle 10. Inwardly depending air exit collectors 240–243 located rearwardly of motor 40, which extend through fairings 196 and 214, provide an additional outlet for heated air, as indicated by arrows 232 and 234. Although exhibiting a greater benefit when used with the front fender assembly of the invention, fairing assembly 192 provides air transfer advantages even when used in conjunction with a conventional front fender.

Since certain changes may be made in the above described apparatus and system without departing from the scope of the invention herein involved, it is intended that all matter contained in the above description or shown in the accompanying drawings shall be interpreted as illustrative and not in a limiting sense.

What is claimed is:

1. A front fender assembly mountable with a motorcycle having a frame, a forward fork assembly pivotally supported by said frame having a two component bifurcate wheel mount supporting a forward wheel and extending upwardly to support steering handlebars, a motor mounted upon said frame rearwardly of said forward fork assembly, a radiator assembly having a forwardly facing air receiving region and supported from said frame intermediate said motor and said forward fork assembly and coupled in cooling fluid transfer relationship with said motor;

said front fender assembly being mountable to and pivotal with said forward fork assembly intermediate said wheel mount and said handlebars and having a longitudinal extent between a front region extending forwardly from said forward fork assembly and a rear region extending rearwardly from said forward fork assembly into spaced adjacency with said radiator assembly, said longitudinal extent being continuously aligned with and located above said forward wheel;

said front fender assembly having an upper portion with an upper surface longitudinally curved along said longitudinal extent, said upper portion having an air intake scoop opening extending therethrough at said front region and an air exit opening at said rear region configured for transferring cooling air into said radiator assembly at said air receiving region; and said front fender assembly having a lower portion with a lower protective surface facing said forward wheel, said lower portion extending between said front region and said rear region, having a channel deriving region spaced from and cooperating with said upper portion to define a cooling air transfer duct extending from said air intake opening to said air exit opening for confronting air at said air intake scoop opening during forward movement of said motorcycle and directing said air to expel from said air exit opening into thermal transfer relationship with said radiator assembly.

2. The front fender assembly of claim 1 in which said upper portion air exit opening is configured to transfer said cooling air into said radiator assembly air receiving region for steering orientations of said forward wheel between a straight ahead orientation and about a 10° turn.

3. The front fender assembly of claim 1 in which:

said front fender assembly upper portion is a discrete component having a top with inwardly and outwardly disposed top surfaces and oppositely and downwardly disposed sides extending from said top; and said front fender assembly lower portion is a discrete component connected with said upper portion and configured to define said cooling air transfer duct.

4. The front fender assembly of claim 3 in which said front fender assembly lower portion is configured having an upwardly disposed duct forming surface and oppositely disposed duct defining side surfaces upwardly depending therefrom extending into contact with said upper portion top.

5. The front fender assembly of claim 4 in which said oppositely disposed duct defining side surfaces converge mutually inwardly to define a venturi tube device at a venturi restriction region located intermediate said front region and said rear region for enhancing the velocity of transfer of said cooling air.

6. The front fender assembly of claim 5 in which said front fender assembly upper portion downwardly disposed sides converge mutually inwardly adjacent said venturi restrictive region to an extent effective for mounting said front fender assembly between said two components of said bifurcate wheel mount.

7. The front fender assembly of claim 1 in which:
said front fender assembly upper portion and lower portion are mutually configured to define a venturi air treatment device at a venturi restriction region located intermediate said front region and said rear region for enhancing the velocity of transfer of said cooling air.

8. The front fender assembly of claim 7 in which:
said front fender assembly venturi restriction region is configured having oppositely and upwardly disposed connector platforms for effecting connection with said wheel mount; and
said connector platforms being transversely spaced apart a distance effective for mounting said front fender assembly between said two components of said bifurcate lower disposed wheel mount.

9. The front fender assembly of claim 1 in which:
said front fender assembly upper portion is a discrete component formed of a polyolefin; and
said front fender assembly lower portion is a discrete component connected with said upper portion and formed of a polyolefin, the downwardly disposed side of which is a smooth porcelain finish layer.

10. The front fender assembly of claim 1 in which:
said front fender assembly upper portion is a discrete component having an inner connector surface portion;
said front fender assembly lower portion is a discrete component having a peripheral joining surface portion positioned in adjacency with said inner connector surface portion; and
including at least two connector assemblies for coupling together said upper portion and said lower portion and for disassembling said lower portion from said upper portion to clear said cooling air transfer duct.

11. The front fender assembly of claim 10 including an air permeable screen removably positioned over said air intake opening.

12. The front fender assembly of claim 1 in which:
said front fender assembly upper portion is formed of a polyolefin and said upper surface comprises a pigmented porcelain layer with a high shine finish; and
said front fender assembly lower portion is formed of a polyolefin and a layer of porcelain at the lower protective surface thereof for retarding the adherence of dirt derived materials thereon.

13. The front fender assembly of claim 12 in which said front fender assembly lower portion layer of porcelain is unpigmented to reduce the weight thereof.

14. The front fender assembly of claim 12 in which said front fender assembly upper and lower portions are integrally formed together by extrusion molding.

15. An air transfer and dirt protection system for a sports motorcycle configured for driving over a dirt containing surface and being of a variety having a frame, a forward fork assembly pivotally supported by said frame, having a two component bifurcate wheel mount supporting a forward wheel and extending upwardly to support steering handlebars, a motor mounted upon said frame rearwardly of said fork assembly, a radiator assembly having a forwardly facing air receiving region extending transversely to said frame between first and second sides supported from said frame intermediate said motor and said forward fork assembly and coupled in cooling fluid transfer relationship with said motor, said air transfer and dirt protection system comprising:
a front fender assembly mountable and pivotal with said forward fork assembly intermediate a lower disposed portion of said wheel mount and said handlebars and having a longitudinal extent between a front region extending forwardly from said forward fork assembly and a rear region extending rearwardly from said forward fork assembly into spaced adjacency with said radiator assembly, said longitudinal extent being continuously aligned with and located above said forward wheel;
said front fender assembly having an upper portion with an upper surface longitudinally curved along said longitudinal extent, said upper portion having an air intake scoop opening extending therethrough at said front region and an air exit opening at said rear region configured for transferring cooling air into said radiator assembly at said air receiving region and movable thereacross between and past said first and second sides when said front wheel is pivoted from said handlebar, said front fender assembly having a lower portion with a lower protective surface facing said forward wheel, said lower portion extending between said front region and said rear region, said fender assembly having a channel region formed between said lower portion of said front fender assembly and said upper portion to define a cooling air transfer duct extending from said air intake opening to said air exit opening for confronting air at said air intake opening during forward movement of said motorcycle and directing said air to expel from said air exit opening into thermal transfer relationship with said radiator assembly; and
first and second side fairings supported from said frame at opposite sides thereof in spaced adjacency with said motor and respective said radiator assembly first and second sides, each being configured to define outwardly extending respective first and second forward air scoops extending outwardly from said first and second radiator sides at locations effective to receive and direct at least a portion of an expelled air and direct said expelled air toward said motor and each being configured having respective first and second fairing air exit openings located rearwardly of said motor.

16. The air transfer and dirt protection system of claim 15 in which:
said front fender assembly upper portion and lower portion are mutually configured to define a venturi air treatment device at a venturi restriction region located within said channel region intermediate said front region and said rear region for enhancing the velocity of transfer of said cooling air.

17. The air transfer and dirt protection system of claim 16 in which:
said front fender assembly venturi restriction region is configured having oppositely and upwardly disposed connector platforms for effecting connection with said wheel mount; and
said connector platforms being transversely spaced apart a distance effective for mounting said front fender assembly between said two components of said bifurcate lower disposed wheel mount.

18. The air transfer and dirt protection system of claim 15 in which:
   said front fender assembly upper portion is a discrete component having an inner connector surface portion;
   said front fender assembly lower portion is a discrete component having a peripheral joining surface portion positioned in adjacency with said inner connector surface portion; and
   including at least two connector assemblies for coupling together said upper portion and said lower portion and for disassembling said lower portion from said upper portion to clear said coding air transfer duct.

19. The air transfer and dirt protection system of claim 15 in which:
   said front fender assembly upper portion is formed of a polyolefin and said upper surface comprises a pigmented porcelain layer with a high shine finish; and
   said front fender assembly lower portion is formed of a polyolefin and a layer of porcelain at the lower protective surface thereof for retarding the adherence of dirt derived materials thereon.

20. The air transfer and dirt protection system of claim 19 in which said front fender assembly lower portion layer of porcelain is unpigmented to reduce the weight thereof.

21. The air transfer and dirt protection system of claim 15, including first and second airfoil members extending inwardly from said first and second side fairings, respectively, said first and second airfoil members being located in spaced adjacency with said motor to enhance the velocity of movement of air into thermal transfer relationship across said motor.

22. The air transfer and dirt protection system of claim 21 in which said first and second airfoil members open rearwardly and are in airflow communication through said first and second side fairings, respectively, so as to effect venturi enhanced airflow into the vicinity of said motor.

23. The air transfer and dirt protection system of claim 15 in which said first and second side fairings each includes at least one inwardly depending air exit collector having an inwardly tapered wall.

24. The air transfer and dirt protection system of claim 15, including a plurality of airfoil members extending inwardly from said first and second side fairings, said plurality of airfoil members being located in spaced adjacency with said motor to enhance the velocity of movement of air into thermal transfer relationship across said motor.

25. A fairing assembly for a motorcycle being of a variety having a frame, a forward fork assembly pivotally supported by said frame having a wheel mount supporting a forward wheel and extending upwardly to support steering handlebars, a motor mounted upon said frame rearward of said fork assembly having a first side and a second side, a radiator assembly having a forwardly facing air receiving region extending transversely to said frame supported from said frame intermediate said motor and said forward fork assembly and coupled in cooling fluid transfer relationship with said motor, said fairing assembly comprising:
   first and second side fairings supported from said frame at opposite sides thereof, said first and second side fairings defining an air pathway extending between an air inlet and an air outlet, whereby when said motorcycle moves forward a flow of air is directed from said air inlet to said air outlet, said motor and said radiator assembly being located within said air pathway between said air inlet and said air outlet and creating within said air pathway a first air passageway and a second air passageway, said first and second side fairings being tapered generally mutually inwardly from said air inlet to said air outlet;
   a first airfoil member extending inwardly from said first side fairing within said first passageway and configured to increase the velocity of said flow of air within said first passageway; and
   a second airfoil member extending inwardly from said second side fairing within said second passageway and configured to increase the velocity of said flow of air within said second passageway.

26. The fairing assembly of claim 25, wherein said first and second airfoil members are integrally formed with said first and second side fairings, respectively.

27. The fairing assembly of claim 25, wherein:
   said first airfoil member opens rearwardly and is in airflow communication through said first side fairing so as to effect venturi airflow into the vicinity of said motor; and
   said second airfoil member opens rearwardly and is in airflow communication through said second side fairing so as to effect venturi airflow into the vicinity of said motor.

28. The fairing assembly of claim 25, including:
   a first plurality of airfoil members extending inwardly from said first side fairing within said first air passageway; and
   a second plurality of airfoil members extending inwardly from said second side fairing within said second air passageway.

29. The fairing assembly of claim 28, wherein:
   each of said first plurality of airfoil members open rearwardly and is in airflow communication through said first side fairing so as to effect venturi airflow into the vicinity of the motor; and
   each of said second plurality of airfoil members open rearwardly and is in airflow communication through said second side fairing so as to effect venturi airflow into the vicinity of the motor.

30. The fairing assembly of claim 28, wherein said plurality of airfoil members are integrally formed with said first and second side fairings.

31. The fairing assembly of claim 25 wherein:
   said first fairing includes a first inwardly depending air exit collector located rearwardly of said motor and having an inwardly tapered wall; and
   said second side fairing includes a second inwardly depending air exit collector located rearwardly of said motor and having an inwardly tapered wall.

* * * * *